INVENTORS J. E. GORMAN
G. D. GREEN
R. TEVONIAN
BY Robert B. Brodie
ATTORNEY

Aug. 27, 1968 J. E. GORMAN ET AL 3,399,385

ACTIVITY REPORTING SYSTEM

Filed Dec. 7, 1965 5 Sheets-Sheet 3

United States Patent Office 3,399,385

Patented Aug. 27, 1968

3,399,385

ACTIVITY REPORTING SYSTEM

James Edward Gorman, West Amwell Township, Hunterdon County, Geoffrey Dawson Green, West Windsor Township, Mercer County, and Ronald Tevonian, Montgomery Township, Somerset County, N.J., assignors to Western Electric Company, Incorporated, New York, N.Y., a corporation of New York Filed Dec. 7, 1965, Ser. No. 512,137

20 Claims. (Cl. 340—172.5)

ABSTRACT OF THE DISCLOSURE

A data collection system includes a number of remote, data entry stations which are connected, respectively, to a number of registration elements on a one-to-one basis. The registration elements are bistable devices normally in a first state. A request for service by one station places its registration element in a second state. All stations are terminated in a scanning device, which, in response to the presence of the second state at any of the registration elements, searches for the requesting station. Upon finding the reqeusting station, the scanning device ascertains an available one of a number of transmission paths. The scanning device then interconnects the found station through the ascertained path to a recorder and generates a signal uniquely identifying the found station. Further facilities impress the station-identifying signal on the recorder while data from the requesting and now interconnected station passes through its element and along the path to the recorder.

Additional features may include:

(1) A number of scanning devices in which selected stations are terminated. If a first of the scanning devices is already busy, i.e., already interconnecting a first station and a first path, that first scanning device passes both the service request and data from a second station on to a second scanning device. The second scanning device then performs as described above.

(2) Facilities in the registration elements which, when the elements are in the second state, render the elements transparent to scanning devices other than the one which has found that particular element.

(3) Expedients which, while a first scanning device is ascertaining an available path, prevent other scanning devices from doing likewise, until the first device establishes a station-path interconnection.

This invention relates to electrical systems for the collection and recording of manually entered data, and more particularly to such systems having special utility within a factory environment.

In the prior art it is known that a plurality of manually operable data entry stations, distributed at discrete locations within a factory, can be connected to a central data recording station. The recorded data can be subsequently machine processed. Manually operable data entry stations are advantageous for receiving information from persons working directly on production lines, or at testing and inspection positions. Data, which may correspond to the number of products tested, components passing inspections, or units completed, can be entered by an operator at a conveniently located data entry station.

The switching arrangements of such prior systems have required revertive signalling between apparatus at the remote and central stations in order to establish communications connections. This requires a bilateral path between the remote and central stations as well as additional responsive apparatus. Furthermore, present systems require the use of buffering at peak traffic periods. Also, the manually operable data entry stations have added complexity since they generate their own station's identification signals.

A review of the art discloses no inexpensive solution to the problem of queuing of availalbe unserved data entry stations. Similarly, the mere substitution of telephone central office switch gear is an unduly complex and expensive modality of coupling remote and central stations.

It is accordingly an object of this invention to simplify the coupling of a remote data entry station to a central station using substantially unilateral nonrevertive signalling.

It is another object of this invention to reduce the need for the buffering of information at peak traffic periods.

It is yet another object of this invention to reduce the queuing of active unserved data entry stations.

It is an object of this invention to simplify the concentration connecting apparatus by deriving dual uses for selected switching elements.

This invention contemplates a basic data collection system in which a plurality of manually operable data entry stations are terminated at a concentrator in a correspondinb number of registration elements. The system further includes a plurality of transmission paths lesser in number than the stations, apparatus within the concentrator for interconnecting an active unserved station to an inactive available transmission path through the registration element, and a memory medium for recording the signals appearing upon the transmission paths.

It is an aspect of this invention that the registration element exhibits a dual capability. By so doing, the concentration connecting apparatus is simplified. First, the registration element exhibits the service request condition of the corresponding data entry station. Second, it operates as part of a transmission connection from the remote station to the channels.

To further simplify the system particularly with respect to the data entry stations, the concentrator includes a dual scanning arrangement and an identification circuit which derives a signal representing the remote station identification from the scanner position. A first scanner ascertains which registration elements are active and unserved under registration element control. A second scanner ascertains the availability of inactive channels under channel control. Once activated, the scanners are incrementally stepped until an unserved element or inactive channel is obtained. The drive circuits which step the respective scanners are then inhibited. At this point in time a through connection from a data entry station to a channel is established. Prior to the transmission of information over the established connection the identification circuit causes a polytonic signal to be applied to the transmission path. The polytonic signal is derived from the first scanner position which is used to electrically modulate an oscillator. Subsequently, the data entry station transmits information.

It is another aspect of this invention that the queuing of data entry stations may be substantially reduced if the registration elements of a first concentrator are terminated at the first scanners of additional concentrators, and if the associated first scanner drive circuits are interconnected, then an active unserved registration element normally associated with a first concentrator can be served at another concentrator.

It is a feature of this invention that an active served registration element having its normally associated first scanner position connected will also have all of its other first scanner appearances at other concentrators transparent for scanning purposes. Thus, only the first scanner appearances of the unserved active registration elements at other concentrators will be detected.

It is yet another feature of this invention that concentrators may be grouped together and connected in parallel to the channels with the seizure of a channel occurring on a nonpriority basis. This is accomplished by the use of an EXCLUSION LOOP threading through the drive circuits of the second or channel scanners.

The recording apparatus may be adapted to identify active transmission paths. The transmission path identification and the station identification provide a complete identification and path tracing of the information transmitted and recorded from each and every data entry station.

The aforementioned objects, aspects, and features of this invention as well as others not mentioned before may be more clearly appreciated when considered in connection with the subsequent detailed description and the following figures, in which.

Figures 1, 1A:
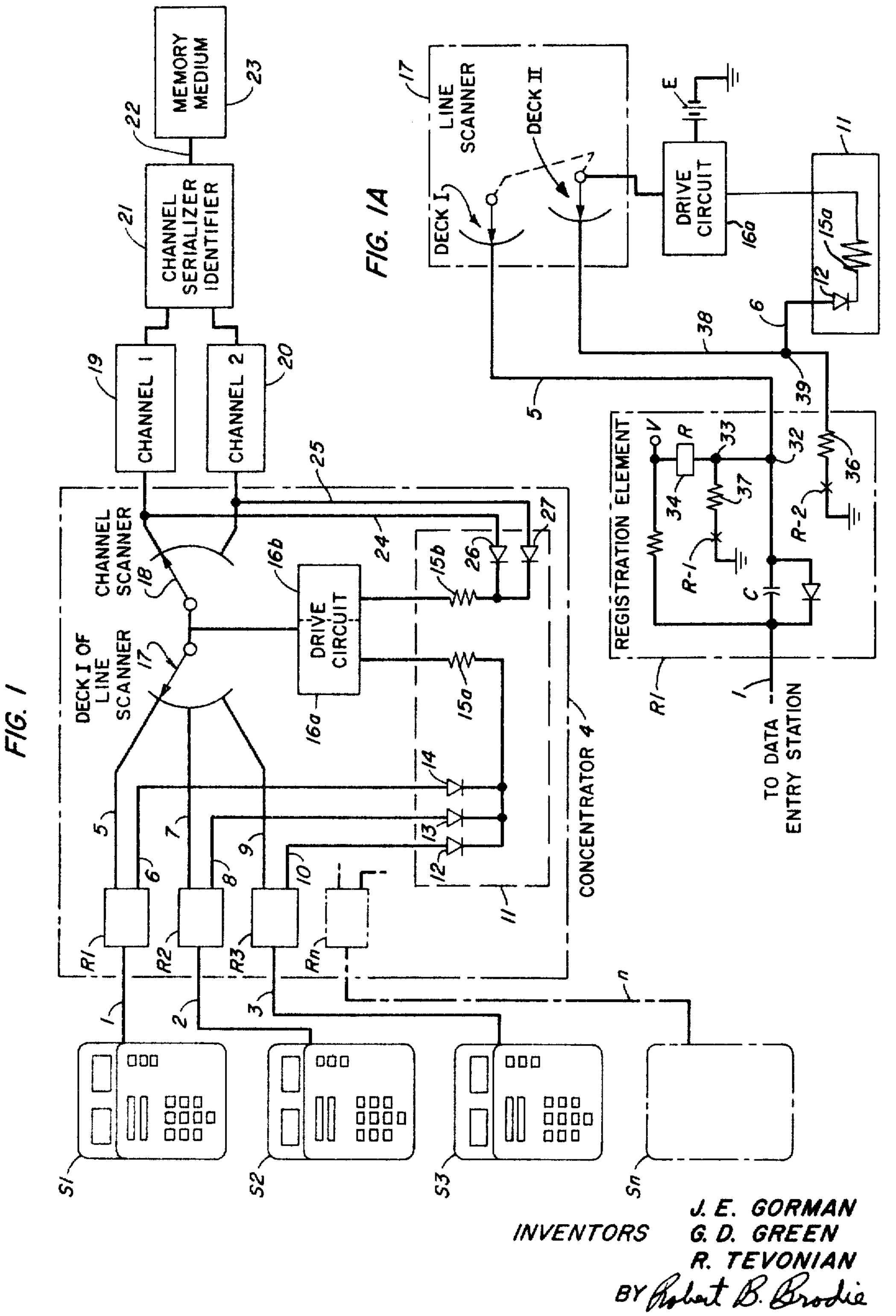
FIG. 1 shows a basic data collection system according to this invention.
FIG. 1A shows a detailed view of a registration element contained within the system of FIG. 1.
Figure 5A:
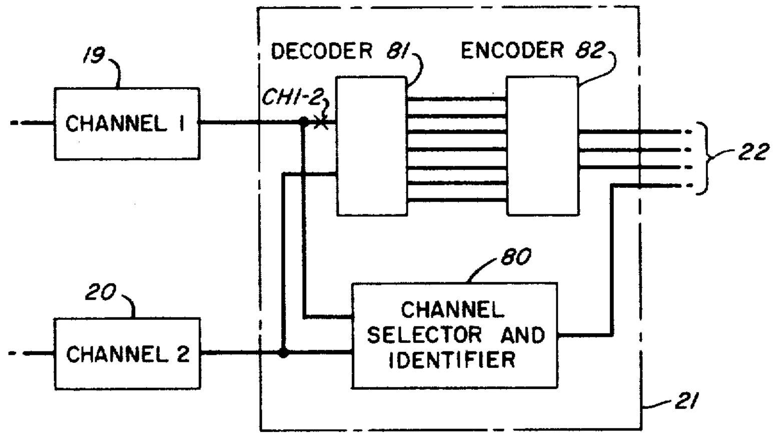
Figure 5B:
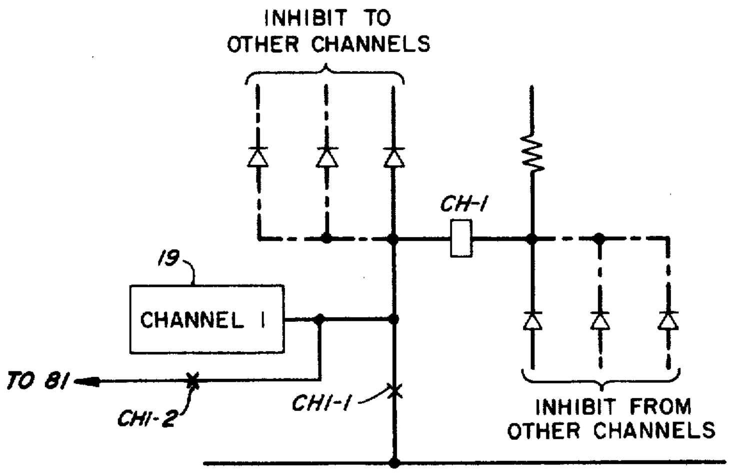

FIG. 5A exhibits elements of a channel serializer-identifier contained in the system of FIG. 1; and FIG. 5B shows a channel selector portion of the serializer-identifier shown in FIG. 5A.

In FIG. 1 a data collection system according to this invention is shown. A plurality of manually operable data entry stations S1, S2, S3 . . . S$n$ are connected respectively to a concentrator 4 over one of a first group of paths 1, 2, 3 . . . $n$. A memory medium 23 for recording signals from the stations S1, etc., is connected to a serializer-identifier 21 by a link 22. A second group of paths 19 and 20 (channel 1 and channel 2, respectively) lesser in number than the first group of paths 1, etc., connects the concentrator 4 to the serializer-identifier 21. The number ($n$) of paths 1, etc., is variable, but is always greater than the number (C) of paths 19, etc.; that is, $n>C$.

The following paragraphs are directed to describing each of the major components shown in FIG. 1. A last paragraph associated with FIG. 1 is devoted to describing a typical operation sequence.

The manually operable data entry stations S1, etc., may comprise any one of a number of well-known serial by character entry devices, for example a modified TOUCH TONE (Registered U.S. Trademark Patent Office) telephone set such as those described in U.S. Patents 3,184,-554 and Re. 25,507. The data entry stations S1, etc., may be modified to include a card reader, which reader senses the presence or absence of information holes in a card to generate electrical signals corresponding to the information represented by the holes.

A plurality of registration elements R1, R2, R3 . . . R$n$ may be formed from any well-known bistable memory elements, such as flip-flop circuits, magnetic cores, or relays having a first normal state. Each registration element R1, etc., is connected, via a corresponding path 1, etc., to a corresponding data entry station S1, etc. The registration elements R1, etc., assume a second or altered stable state in response to the receipt of a service request signal, which may be a potential shift generated by the corresponding data entry station S1. It should be noted, that each registration element R1, etc., has a first termination via lines 5, 7 and 9, respectively, in a line scanner 17 and a second termination via lines 6, 8 and 10, respectively, in a common logic circuit 11.

The lines 5, etc., serve two purposes. First, such lines provide means by which the line scanner 17 senses whether the registration elements R1, etc., are in the altered stable state. Second, the lines 5, etc., also act as transmission connections from the data entry stations S1, etc., over the paths 1, etc., through the registration elements R1, etc., over the lines 5, etc., to the line scanner 17 for the transmission of data.

Active, unserved data entry stations S1, etc., or registration elements R1, etc., are defined as those stations or elements which have either generated or responded to a service request signal, but which are not yet connected to the memory medium 23 through the scanners 17 and 18.

The common logic circuit 11 includes a first logic OR gate which comprises diodes 12, 13, and 14 terminating in a load element such as a resistor **15*a*. The common logic circuit 11 propagates a stepping signal in response to a service request signal being sensed by a registration element R1, etc. The stepping signal is transmitted to a drive circuit 16*a*. The drive circuit 16*a* steps the line scanner 17** upon receipt of the stepping signal.

The line scanner 17 may comprise a multi-decked rotary stepping switch or other serial scanning device, of which only DECK I is shown in FIG. 1, having all wiper arms ganged. DECK I of the scanner 17 detects an active unserved registration R1, etc., and, provides an electrical path for signals from the data entry station S1, etc., corresponding to such registration element S1, etc. In operation, a wiper arm of the scanner 17 is stepped in response to a stepping signal and continues motion until the termination 5, etc., of the active unserved registration element R1, etc., is contacted by the wiper arm. As a result of such detection, stepping of the drive circuit **16*a*** is inhibited.

A channel scanner 18 may, similarly to the line scanner 17, be formed from a rotary stepping switch or other serial scanning device. The scanner 18 terminates the paths 19 and 20 (channels 1 and 2) which are also parallel-terminated in the common logic circuit 11 through lines 24 and 25 equal in number (C) to the number of paths 19, 20 ($n>C$). In addition to the diodes 12–14, the common logic circuit 11 comprises a second logic OR gate which includes a resistor **15*b*, diodes 26 and 27, and the lines 24 and 25**, respectively.

A wiper arm of the channel scanner 18 is stepped by a drive circuit **16*b* in response to the detection thereby of ground appearing on either of the lines 24 and 25 through the resistor 15*b*. Such ground is applied to the lines 24, 25 by an available channel 19, 20. Stepping continues until the ground is sensed on the channel scanner terminations by the wiper arm of the scanner 18. When this sensing occurs, stepping of the drive circuit 16*b* is inhibited. Thus, an available channel 19, 20** is detected.

With a transmission connection now established from one of the data entry stations, e.g., S1, through the line scanner 17, the channel scanner 18, to an available channel, e.g., 19, a signal uniquely identifying both the detected data entry station S1 and the registration element R1 is derived from the position of the wiper arms of the other decks (DECKS III and IV in FIG. 2) of the line scanner 17. This identification signal may be transmitted to the memory medium 23 over the selected channel path, e.g., 19, detected by the channel scanner 18 and the serializer-identifier 21. The description of the generation and use of the identification signal is set forth in detail in connection with the discussion of FIG. 2.

The serializer-identifier 21 is designed to terminate the channels 19, 20 and convert parallel information into serial-by-character form. This form is more suitable for recording on magnetic or paper tape at the memory medium 23. Additionally, the serializer-identifier 21 may generate a signal uniquely identifying the channel, e.g., 19, over which data has been transmitted to the memory medium 23. A more detailed discussion of the serializer-identifier 21 is set forth in connection with the description of FIGS. 5A and 5B.

The memory medium 23 may comprise any one of a number of well-known recording devices such as punched paper tape, magnetic tape, etc.

Operationally, a data entry station, e.g., S1, may be connected through the concentrator 4 over a channel, e.g., 19, to the memory medium 23 by transmitting a service request signal over the corresponding line 1. Such signal sets the associated registration element R1, normally in a first stable state, in the altered or second stable state. The change of state of the registration element R1 is applied over line 6, e.g., as a voltage change, through the common logic circuit 11. The common logic circuit propagates a stepping signal in response to the service request signal. In response to the stepping signal, the drive circuit 16*a* steps the wiper arm of the line scanner 17 in serial fashion until the wiper arm of the scanner 17 contacts the line 5 over which the change of state is also applied, e.g., as a voltage change. Contact of the line 5 by the wiper arm of DECK I of the scanner 17 in this manner concurrently with the application of the change of state of the registration element R1 to the line 6 is referred to as detection of an active, unserved data entry station. The drive circuit 16*a* is disabled by such detection.

Disabling the drive circuit 16*a*, causes the channel scanner 18 to be stepped by the drive circuit 16*b* to scan for an inactive, available channel. Such scanning operation is initiated by the concurrence of the disabling of the drive circuit 16*a* and the ground level on one of the lines 24, 25, indicating the existence of at least one inactive available channel 19, 20. The ground level may be derived by the closing of a path to a suitable reference magnitude within one of the channels 19, 20. Upon finding an available channel, e.g., 19, the station identification signal, derived from DECK III and IV (FIG. 2) of the line scanner 17 may be transmitted through the channel scanner 18 over channel 19 through the serializer-identifier 21 to the memory medium 23. A character from the data entry station S1 is now transmitted over the established path 1, R1, 5, 17, 18, 19. As the parallel data is converted into serial-by-character form at the serializer-identifier 21, the channel identifying signal is attached thereto. The serialized data and the signals uniquely identifying the station S1 and the channel 19 may now be transmitted over the link 22 for recording at the memory medium 23.

In order to disconnect the station S1 from the established path 1, R1, 5, 17, 18, 19, use is made of a time-out circuit. This circuit is familiar to those skilled in the art and may consist of a capacitive timer in the channels 19, etc., responsive to the presence of signals on the established path 1, R1, 5, 17, 18, 19. If data is not transmitted within a predetermined time from the last detected character, then the established path is automatically broken.

Moreover, generation of a service request signal by a remote station S1, etc., actuates the timer to break the path, 1, R1, 5, 17, 18 and 19. When the drive circuit 16*a* is inhibited upon the line scanner 17 detecting an active unserved registration element, the drive circuit 16*b* is activated to cause the channel scanner 18 to search for an inactive available channel. This function may be effected by a relay circuit, not shown, in which the opening of first contacts to inhibit the drive circuit 16*a* concurrently closes second contacts which activate drive circuit 16*b*.

FIG. 1A is a detailed drawing of one of the registration elements R1, etc. As previously mentioned, a service request signal is applied from a station S1, etc., to its corresponding registration element R1, etc., over a corresponding connecting line 1, etc. This signal is AC coupled through a capacitor C and applied to anode 32. A coil 34 of a relay R begins to draw current from a voltage source V. This drawing of current operates the relay R to close normally open contacts R–1. Closure of the contacts R–1 establishes a current path through anode 33, a resistor 37, the contacts R–1 to ground. Such current path establishment assures that the relay R remains operated. Thus, the service request signal of a data entry station is registered by establishment of the path 33, 37, R–1, ground.

Drawing of current by the relay coil 34 also closes normally open contacts R–2 of the relay R to establish a current path from the registration element to the common logic circuit 11. This established path comprises ground, the now closed contacts R–2, a resistor 36, node 39, the line 6, one of the diodes such as 12, the resistor 15*a*, and a grounded source E. Establishment of the path ground, R–2, 36, 39, 6, 12, 15*a*, operates the drive circuit 16*a* to step the wiper arms of DECKS I–IV of the line scanner 17. If the line scanner 17, is a rotary stepping switch, the wiper arms step until the line 6 associated with the active registration element R1 responsible for the operation of the relay R is contacted by the wiper arm of DECK II. Such contact of the line 6 inhibits the drive circuit 16*a*. This inhibiting is effected by a current path being set up through the closed relay contact R–2, resistor 36, service a line 38, the wiper arm of DECK II of the scanner 17, and drive circuit 16*a*. The drive circuit 16*a* includes a current sensing element (not shown) which opens circuits (not shown) within the drive circuit 16*a* upon the establishment of the path R–2, 36, 39, 38 and the DECK II wiper arm to inhibit the stepping of the scanner 17. Concurrently, another current from the control circuits within the drive circuit 16*a* is superimposed upon the path R–2, 36, 39, 38 and the DECK II wiper arm which back-biases the diode 12 at the common logic circuit 11. Such back-biasing electrically isolates node 39 from the common logic circuit 11. This isolation prevents the path ground, R–2, 36 and 39, from the node 39 to the wiper arm of DECK II of another line scanner from being established to prevent such other line scanner in which the registration element R1 is terminated (via the node 39) from detecting the same data entry station S1. Thus, the registration element is made transparent to any other searching line scanner in another concentrator. This aspect is of particular significance where two or more concentrators are used and is further illuminated in connection with the discussion of FIG. 3. It should be noted that the relay R remains operated so that the registration R1 now represents an active served data entry station.

Figure 2:
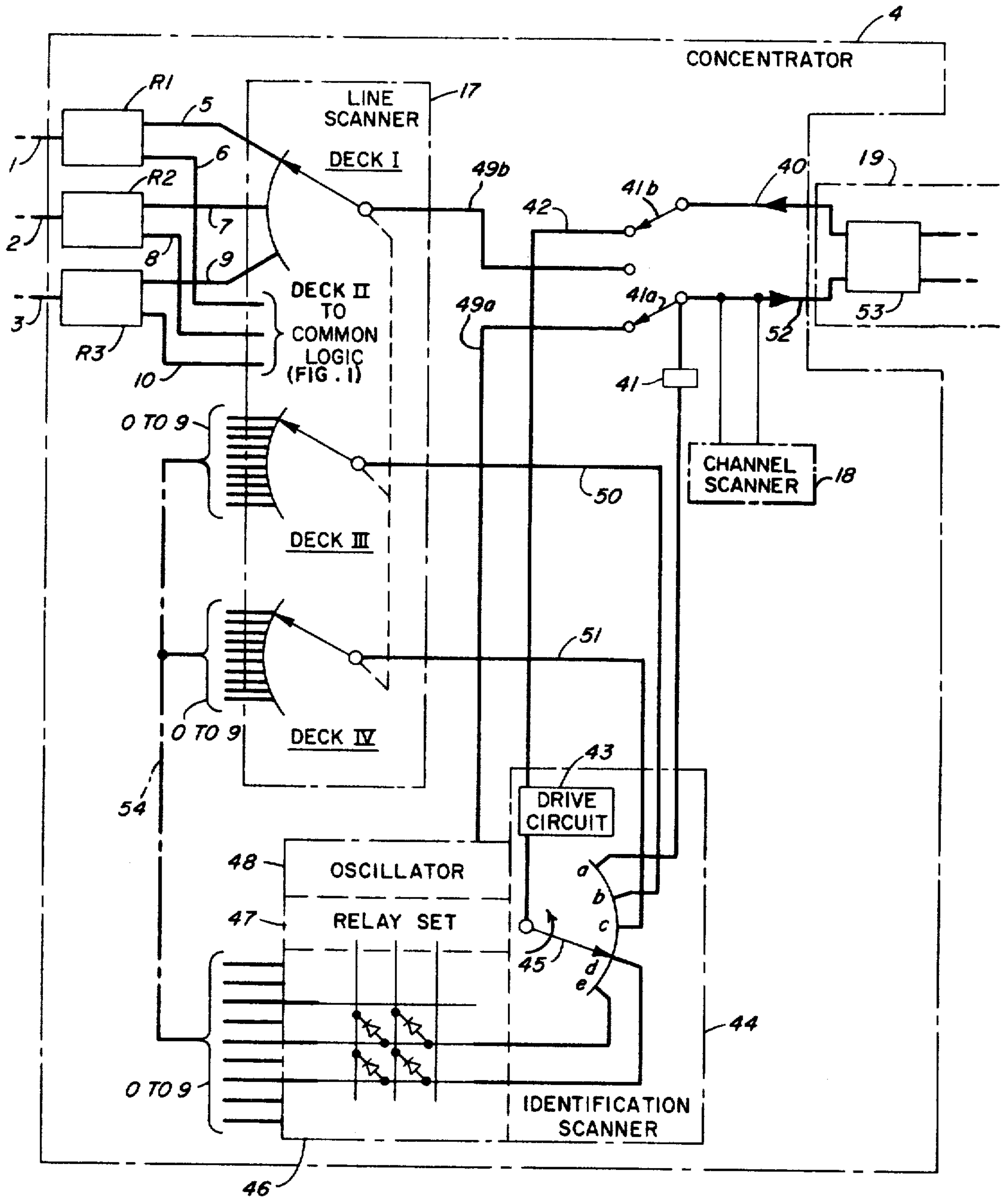
FIG. 2 is a detailed diagram of a concentrator portion of the data collection system of FIG. 1 emphasizing the means for deriving a station identification signal.

FIG. 2 is a detailed view of the concentrator 4 of the data collection system. This figure emphasizes the apparatus by which a unique data entry station identification signal is derived from each position of the ganged wiper arms of the line scanner 17. The data entry station identification signal may be transmitted prior to and as a part of the data from the data entry station to the memory medium 23.

As is shown in FIG. 2, the line scanner 17 comprises a four-decked rotary stepping switch in which the wiper arms are mechanically ganged together. Lines 5, 7 and 9 of the registration elements R1, R2, and R3 are shown electrically terminated in DECK I of the line scanner 17. Lines 6, 8 and 10 terminate in DECK II (FIG. 1A). DECKS III and IV cooperate with other elements hereinafter described for generating the unique data entry station identification numbers signal. The concentrator also 4 includes an identification scanner 44 having a wiper arm 45. Also shown is the coil 41 of a station connecting relay connected through the channel scanner 18 to a feedback generator 53 of a channel, e.g., 19, over a signal path 52. The relay coil 41 is selectively operable to move a pair of wiper arms 41*a* and 41*b*. The wiper arm 41*a* selectively completes a connection over the path 52 between the feedback generator 53 and either a path 49*a* running to an oscillator 48 or a path 49*b* running to the wiper arm of DECK I. The wiper arm 41*b* selectively makes or breaks a connection over a feedback path 40 between the feedback generator 53 and a path 42 running to a drive circuit 43 for the wiper arm 45 of the identification scanner 44.

The identification scanner 44, also includes a code generator portion comprising a diode matrix 46, a relay set 47 and the oscillator 48.

When the wiper arm 45 is positioned at terminals *e* or *d* of the scanner 44, predetermined junctions of the matrix 46 are responsive to signals from the feedback generator 53 over the lines 40 and 42 and over the wiper arm 45 to selectively operate the relay set 47 and the oscillator 48. Such operation of the oscillator 48 generates unique polytonic signals on the line 49*a* which uniquely identifies the concentrator 4. These polytonic signals may be transmitted via the line 49*a*, the wiper arm 41*a*, the channel scanner 18 and the line 52 through the feedback generator 53 to the recording medium 23.

When the wiper arm 45 is positioned at terminals *c* or *b* of the scanner 44, predetermined junctions of the matrix 46 are subjected to signals from the feedback generator 53 over the lines 40 and 42, lines 51 or 50, the wiper arms of DECKS III and IV of the line scanner 17 and a line 54 running from DECKS III and IV to the matrix 46. Just which junctions of the matrix 46 are so subjected is determined by the position of the DECKS III and IV wiper arms which are ganged to the DECKS I and II wiper arms. The relationship between each position of the DECKS III and IV wiper arms and the various junctions of the matrix is unique.

Thus, depending on the DECKS III and IV wiper arm positions, the relay set 47 and the oscillator 48 are predeterminedly operated. Such operation of the oscillator 48 generates a selected, unique polytonic tone on the line 49*a* which identifies the position not only of the DECKS III and IV wiper arms, but also of the DECKS I and II wiper arms. Accordingly, because, as previously described, the DECKS I and II wiper arms have already detected an unserved, active remote station R1, etc., that station is uniquely identified by the polytonic signal on the line 49*a*.

The polytonic signal identifying the remote station is transmitted via the line 49*a*, the wiper arm 41*a*, the channel scanner 18 and the line 52, through the feedback generator 53 to the recording medium.

When the wiper arm of DECK I of the line scanner 17 stops and becomes electrically connected to an active unserved registration element (e.g., R1 via the line 5) and the channel scanner 18 is electrically connected to an available inactive channel, e.g., 19, the wiper arm 45 of the scanner 44 contacts terminal *e* thereof. The signal from feedback generator 53 operates the oscillator 48 to generate the unique polytonic signal and also initiates operation of the drive circuit 43 of the scanner 44. Recepit of the polytonic signal by the feedback generator 53 over the path 49*a*, 41*a*, channel scanner 18 and path 52, removes the normally generated feedback signal from the paths 40, 41*b* and 42. The removal of the feedback signal causes drive circuit 43 to step one unit (from *e* to *d*) and disables the oscillator 48 when the wiper arm 45 is in transit. However, the loss of the polytonic signal from line 49*a* causes the feedback generator 53 to once again generate the feedback signal on the lines 40 and 42 causing a new polytonic signal to be applied to the feedback generator 53.

Again, the feedback signal is removed from the lines 40 and 42 to step the wiper arm 45 to terminal *c*. Contact of the terminals *e* and *d* by the wiper arm 45 effects the generation, along the path 18, 52, 53, on the channel 19 of the polytonic signals identifying the concentrator 4.

Similar operation of the wiper arm 45 of the scanner 44 contacts the terminals *c* and *b* to effect the generation, by the oscillator 48, of the unique polytonic signals identifying the remote station S1. These latter identifying signals, as described above, are applied to the channel 19 over the path 40, 41*b*, 42, 43, 45, *b* or *a*, 50 or 51, DECK III or IV, 54, 46, 47, 48 49*a*, 41*a*, 18 52 and 53.

It should be noted that the feedback signal operates the oscillator depending upon the position of the wiper arm 45, through the terminals *b*, *c*, *d*, or *e*.

Positions *d* and *e* of the wiper arm 45 are in the path over which the polytonic signals identifying the concentrator 4 are generated. Terminals *b* and *c*, lines 50 and 51, and the corresponding terminations 0 to 9 on DECKS III and IV effect the identification of the data entry station which is presently being served.

In summary, the remote station identification is generated upon a connection being established between a registration element, the line scanner, the channel scanner and the channel by applying a feedback signal from the feedback generator through channel scanner to the identification scanner, causing a unique polytonic signal to be transmitted from the identification scanner over the established connection through the memory medium 23. The polytonic signal periodically disables the oscillator to step the wiper arm 45 to a subsequent position and successively applying the next polytonic signal.

After the identification signals have been transmitted, via the terminals *e*, *d*, *c* and *b*, the wiper arm 45 contacts the terminal *a*. Such contact applies a feedback signal from the generator 53 over the path 40, 41*b*, 42, 43, and 45*a* to the relay coil 41. The relay coil 41 is now energized to break the feedback path 40, 42 at 41*b* and connect the signal path 52 to the DECK I of the line scanner 17 via the line 49*b* and the wiper arm 41*a*. At this point in time data characters may be transmitted from the station S1 through to the memory medium 23 via the path S1, 1, R1, 5, 17, 49*b*, 41*a*, 18, 52 and 53. Breaking the feedback path 40, 42 at 41*b* causes the drive circuit 43 to move the wiper arm 45 to the terminal *e* for subsequent operation cycles.

Figure 3:
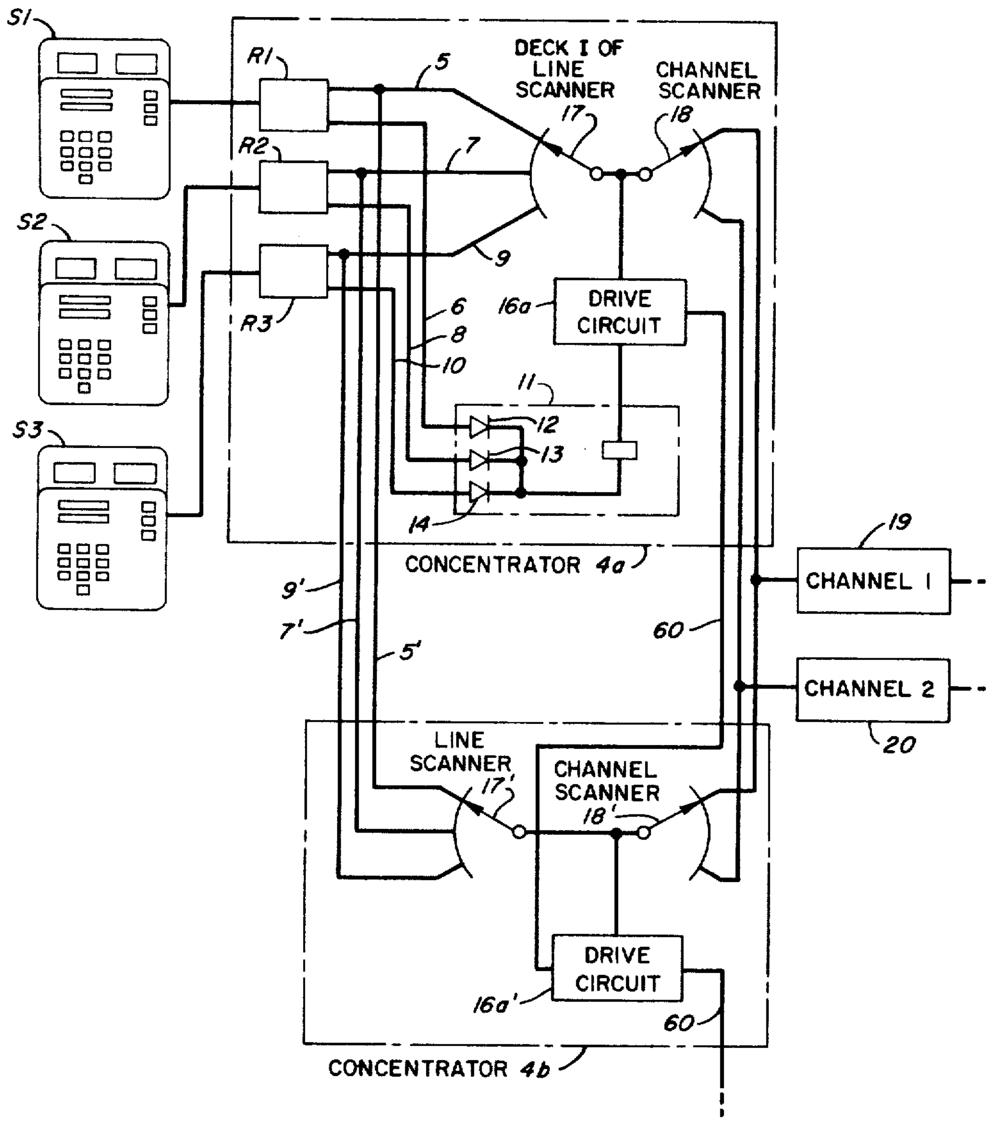
FIG. 3 shows an expanded data collection system according to the invention depicted in FIG. 1 in which unserved active stations queued at a first terminating concentrator may be processed by a second terminating concentrator.

FIG. 3 shows an arrangement of concentrators 4*a* and 4*b* and associate apparatus which permits a data entry station unable to obtain service at a first concentrator, e.g., 4*a*, to be switched through and be processed by an available concentrator, e.g., 4*b*.

In this figure each data entry station S1, S2, S3 is electrically terminated at concentrator 4*a* in a corresponding registration element R1, R2, R3.

In turn, each of the registration elements is normally connected over lines 5, 7, and 9 to the line scanner 17. Additionally, each of the registration elements is also terminated at the concentrator 4*b*, in a line scanner 17′, over lines 5′, 7′, and 9′. Furthermore, the drive circuits 16*a* and 16*a′* are electrically connected by a common bus 60. An unlimited number of concentrators can be connected by the common bus in the same manner.

If a regitsration element, e.g., R1, is activated and served by line scanner 17, the concentrator 4*a* is temporarily unable to provide service to any other active unserved registration element, e.g., S2. When a second registration element, e.g., R2, becomes activated, common logic circuit 11 conducts the service request signal therefrom through the drive circuit 16*a*. Drive circuit 16*a*, when inhibited, electrically couples logic circuit 11 to the common bus 60. Thus, the service request signal from R2 is transmitted over the common bus 60 to drive circuit 16*a′* of concentrator 4*b*. If line scanner 17′ is not serving a data entry station, then drive circuit 16*a′* will drive scanner 17′ until a connection is established with registration element R2 over line 7′.

It should be recalled that when a registration element is being served, its appearances on other scanner terminations are transparent. Thus, when concentrator 4*b* encounters registration element R1 on the line 51 it will continue to search for an active unserved element which is requesting service. Similarly, if concentrator 4*b* is serving an element, the signal representing R2 will be further propagated over the line 8, the diode 13, the drive circuits 16*a* and 16*a'* and the common bus 60 to another concentrator.

Figure 4:
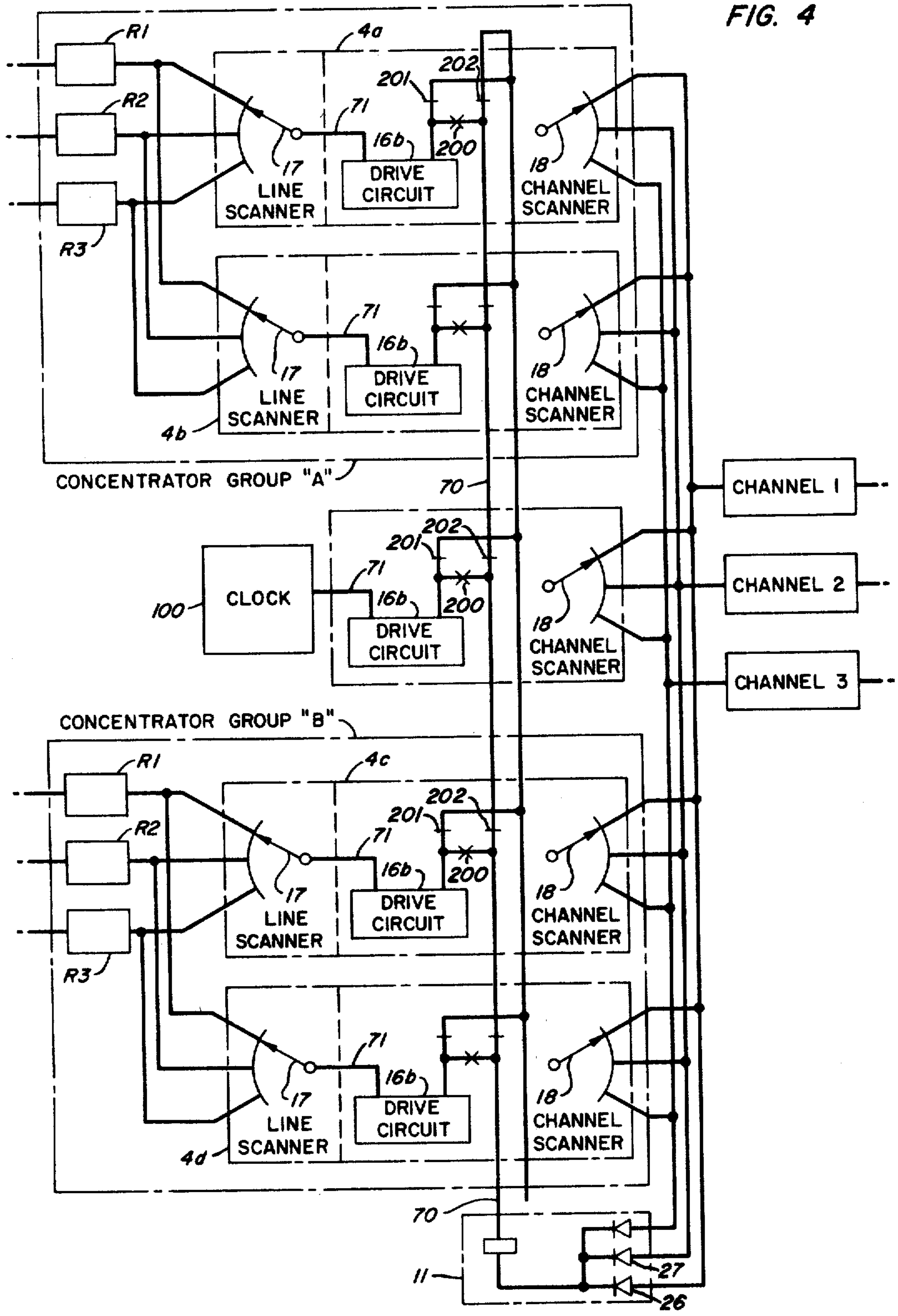
FIG. 4 shows an expanded data collection system according to the invention of FIG. 1 illustrating means common to groups of concentrators for seizing an exclusive path to a memory medium.

FIG. 4 is directed to the use of an EXCLUSION LOOP which permits a channel scanner to seize an inactive available channel to the exclusion of all other channel scanners. Concentrator group A comprises concentrators 4*a* and 4*b*. Concentrator group B comprises concentrators 4*c* and 4*d*. Each of the channel scanners 18 terminates in parallel the channels 1, 2, and 3. Each of the wiper arms of the line scanners 17 is logically connected to the corresponding channel scanner drive circuit 16*b* over a line 71 which merely represents the paired relationship of the scanners drive circuits 16*a* and 16*b* as shown in FIG. 1. An EXCLUSION LOOP 70 couples each of the channel scanner drive circuits 16*b* through appropriate relay connections 200, 201 and 202. Thus, a signal from the logic circuit 11 external to the concentrator groups A and B exists upon the EXCLUSION LOOP connected to the individual drive circuits 16*b* to permit the channel scanners to be activated individually. Such signal, as previously mentioned, is a ground potential applied to the logic circuit 11 by an available channel 19, etc. When activated, a relay internal to the circuits 16*b* closes the narmally open contacts 200 and opens the normally closed contacts 201, 202 and the individual drive circuit prevents the signal from coupling any other drive circuit. Thus, only one channel scanner 18 is searching at any given time.

The channel scanners 18 may be ganged, multi-decked stepping switches similar to the line scanners 17. Thus, a second deck of the channel scanners 18 may, when the available channel termination is contacted, apply the ground signal to and inhibit the drive circuit 16*b*. Such inhibition of the drive circuit 16*b* returns its relay contacts 201 and 202 to the normally closed state and its contacts 200 to the normally open state. Accordingly, a second channel, e.g. 20, may subsequently be seized, while a first channel, e.g. 19, is still being used.

This arrangement avoids a priority advantage of one concentrator group over another concentrator group. Since the EXCLUSION LOOP is driven by the logic circuit 11, the first activated drive circuit 16*b* is the first served with respect to channel scanning.

A clock 100 may be included within the system. It is advantageous to electrically connect the clock as if it were a concentrator element such as the identification scanner 44. Accordingly, the clock may be directly connected to a drive circuit 16*b* and channel scanner 18. The clock is connectable to a channel through the associated drive circuit 16*b* and channel scanner 18 in substantially the same manner as a detected registration element. Time information is transmitted in substantially the same way as the station identification information. The clock enjoys a priority advantage because there is no time lost in scanning registration elements.

FIG. 5A shows the channel serializer-identifier 21. This element is also shown in FIG. 1. Basically, the serializer-identifier 21 puts in sequence by character format, the parallel character appearances on the channels for suitable recording by a serial memory medium such as a punched paper tape. The serializer-identifier 21 comprises a channel selector and identifier portion 80, which selects the channels in a manner described below. Additionally, the serializer-identifier 21 inserts a signal representative of the channel identity and transmits this signal along with the character upon the link 22.

The decoder 81 and encoder 82 are shown for purposes of completeness. Thus, the serializer-identifier may transform a code not only with respect to concurrence of characters but also with respect to the bit designations. The decoder and encoder may consist of two coded diode matrices or other well-known equivalents.

FIG. 5B shows the structure in FIG. 5A by which the channel may be exclusively selected and coupled to link 22 for at least a character time interval.

A signal appearing upon a channel, for example 19, serves to operate relay CH1 and inhibit all other channel selection relays (not shown), thereby preventing other channels from being connected to link 22 for a time interval. The interval represents a character interval on the recording medium.

It should be noted that operation of the relay CH–1 closes normally open contacts CH1–2 and CH1–1 to complete a path between the channel 19 and both the decoder 81 and the channel selector 80. When no signals appear on the channel 19, the relay CH–1 is deenergized to return the contacts CH1–2 and CH1–1 to the open state and to remove the inhibition from the other channel selection relays (not shown). Operation of the relay CH–1 and/or its contacts CH1–1 and CH1–2 may be used to derive the signal identifying the channel 19.

Alternative to a channel selector and identifier such as is shown in FIG. 5A, the characters appearing upon the channels may be recorded upon a multitrack medium such as magnetic tape. This will likewise preserve the channel identification and time relationship.

While a particular embodiment of this invention has been illustrated and described, the invention is not limited thereto but is capable of various other embodiments which may be readily appreciated by those skilled in the are in view of the foregoing disclosure.

What is claimed is:

1. A data collection system comprising:
- a plurality of remote manually operable data entry stations;
- a plurality of registration elements corresponding respectively to the remote stations, each element altering its state in response to a service request from its corresponding remote station;
- a plurality of transmission paths lesser in number than the number of remote stations;
- means for electrically connecting an unserved active remote station through its corresponding registration element to an inactive available transmission path; and
- means connectible to the transmission paths for recording data and signal appearances thereon;
- the means for electrically connecting the remote stations to the transmission paths including:
  - a scanner responsive to the state of the registration elements for identifying the unserved active remote station, and
  - means for impressing upon a connected transmission path a signal representing the remote station identification.

2. A data collection system according to claim 1, characterized in that the means for impressing upon a connected transmission path the remote station identification signal includes means for generating a polytonic code representative of the scanner position.

3. A data collection system comprising:
- a first and a second concentrator;
- a plurality of remote manually operable data entry stations terminating at the concentrators, at least one of which remote stations terminates in both concentrators;
- a plurality of transmission paths lesser in number than the number of remote stations connectible to the concentrators; and
- means for recording data and signal appearances upon the paths;
- each concentrator including:
  - means for detecting an unserved active remote station terminated at the concentrator,
  - means for ascertaining an inactive available transmission path, and
  - means for interconnecting the detected unserved active remote station to the ascertained inactive path;

at least the first concentrator further including:

means responsive to the queue at one of the concentrators of at least one unserved active remote station which terminates at both of the centrators for activating the interconnecting means at the other concentrator having the terminations of the same unserved active remote station thereat.

4. A data collection system according to claim 3, characterized in that the means for detecting unserved active remote stations comprises:

means in the concentrators for serially scanning the remote stations terminated therein, and a drive circuit for incrementally stepping the scanning means under control of an active unserved remote station, the drive circuit of each concentrator being serially connected such that service request signals from an active unserved remote station terminated at one of the concentrators with an already established interconnection will be transmitted through the drive circuit of the one concentrator to the drive circuit of the other concentrator.

5. A data collection system comprising:

a first and a second group of concentrators;

a plurality of remote manually operable data entry stations terminating in the concentrators;

a plurality of transmission paths equal to or less than the number of concentrators;

each concentrator within a group having means for ascertaining inactive available ones of the transmission paths;

means common to the first and second groups of concentrators for electrically connecting a given concentrator to an ascertained inactive available transmission path to the exclusion of all other concentrators; and means for recording signal appearances upon the transmission paths;

each concentrator including:

a scanner for detecting unserved active data entry stations terminating in the concentrator, and means responsive to the scanner for activating common means for interconnecting a detected unserved active data entry station to an ascertained inactive available transmission path.

6. A data collection system comprising:

a plurality of remote, manually operable, data entry stations;

a plurality of registration elements normally in a first state and corresponding respectively to said remote stations, each of said elements altering its state in response to a service request from its corresponding remote station;

a plurality of transmission paths lesser in number than the number of remote stations;

means for connecting an unserved active remote station through its corresponding registration element to an inactive available transmission path, which connecting means includes a scanner responsive to the altered state of the registration elements for identifying a corresponding unserved active remote station;

means connectible to the transmission paths for recording data appearing thereon; and means responsive to the identification of an unserved active remote station by the scanner for impressing a signal representing the remote station identification on said recording means.

7. The data collection system set forth in claim 6 which further comprises:

means responsive to the connection of an unserved active remote station through the corresponding registration element to an inactive available transmission path for generating a signal identifying the available path and for applying the identification signal to the recording means.

8. A data collection system comprising:

(A) a first and a second concentrator;

(B) a plurality of remote, manually operable, data entry stations, at least one of which stations terminates in both concentrators;

(C) a plurality of transmission paths lesser in number than the number of remote stations, the paths being connectible to the concentrators; and (D) means for recording data appearing upon the paths;

each concentrator (A) including:

(1) means for detecting an unserved, active data entry station terminated at the concentrator in response to a service request from such station, (2) means for ascertaining an inactive available transmission path, and (3) means for interconnecting a detected, unserved, active station to an ascertained inactive path;

the detecting means (1) further including:

(a) means for serially scanning the stations terminated in the concentrator, and (b) a drive circuit for incrementally stepping the scanning means under control of the service request from an active unserved remote station, the drive circuits of the concentrators being serially connected so that service requests from an active, unserved station terminated in a concentrator with an already established interconnection between a station and a path is transmitted through the drive circuit of that concentrator to the drive circuit of the other concentrator in which the station is also terminated.

9. The data collection system set forth in claim 8 wherein at least one of the concentrators further includes:

means responsive to the queue of at least one unserved active station which terminates in both concentrators for activating the interconnecting means at the other concentrator.

10. A data collection system comprising:

a plurality of remote manually operable data entry stations;

a plurality of transmission paths lesser in number than the number of remote stations;

a plurality of concentrators in which the stations and the transmission paths are terminated, each concentrator including:

means responsive to a service request for detecting an unserved active data entry station, means responsive to the detecting means for interconnecting the detected unserved active station to an inactive aavilable transmission path, and means responsive to the detecting means for generating a signal identifying the detected remote station; and means for recording data from the detected active remote station on the transmission paths and for recording the identification signal.

11. The data collection system set forth in claim 10 wherein the detecting means in each concentrator further includes:

means for serially scanning the station terminations; and a drive circuit for incrementally stepping the scanning means under the control of an active unserved station, the drive circuits of the concentrators being serially connected so that a service request from an active unserved station terminated at a concentrator with an already established station-path interconnection is transmitted through the drive circuit thereof to the drive circuit of one of the other concentrators.

12. The data collection system set forth in claim 10 wherein the concentrators further include means responsive to the queue of at least one unserved active station at any concentrator with the already established station-path interconnection for activating the detecting means and the interconnecting means at the other of the concentrators.

13. A data collection system comprising:

(A) a plurality of remote, manually operable, data entry stations;

(B) a plurality of normally inactive transmission paths lesser in number than the number of the remote stations;

(C) means for recording data appearing on the transmission paths;

(D) means in the stations for generating a service request signal, with signal indicates (1) that the station is active and prepared to enter data into the recording means, and (2) that the station is unserved and requesting that it and an inactive transmission path be interconnected;

(E) a plurality of concentrators in which the stations and the transmission paths are terminated, each concentrator respectively including:

(1) means responsive to a service request signal for detecting an active unserved station, (2) means responsive to the detection of an active unserved station by the detecting means for interconnecting the detected station to an inactive transmission path, whereby the station is now served and the path is now active, and (3) means responsive to the detecting means for generating a signal which identifies the detected station; and (F) means for applying the station identification signal to the recording means.

14. The system set forth in claim 13 wherein selected concentrators further include:

(4) means connecting together the detecting means of the selected concentrators for passing service request signals from active, unserved stations through the detecting means of any one of the selected concentrators to the detecting means of the other selected concentrators while the interconnecting means of the one selected concentrator is already interconnecting a served station to a path.

15. The system set forth in claim 14 wherein the selected concentrators further include:

(5) means responsive to the detection of a station by the detecting means for rendering the detected, now served station transparent to the detecting means of the other selected concentrators.

16. The system set forth in claim 15 wherein the interconnecting means includes:

means for ascertaining the presence of an inactive transmission path prior to the station-path interconnection.

17. The system set forth in claim 16 wherein all of the concentrators further include:

(6) means connecting together the interconnecting means of all of the concentrators and responsive to the operation of the ascertaining means of one of the concentrators for preventing the operation of the ascertaining means and of the interconnecting means of the other concentrators until the interconnectig means of the one concentrator establishes a station-path interconnection.

18. The system of claim 17 wherein all of the concentrators further include:

(7) means responsive to the interconnecting means for generating a signal identifying the ascertained inactive path and for applying the path-identifying signal to the recording means.

19. The system of claim 18 wherein the interconnecting means includes:

time-out means for breaking a station-path interconnection in response to the failure of a detected station to enter data into the recording means within a predetermined time; and means responsive to a service request signal from an already active, served station for breaking the station-path interconnection.

20. The system of claim 19 which further comprises:

(G) clock means which periodically record time information on the recording means, the clock means being connected to the preventing means for precluding the operation of all of the ascertaining means and of all of the interconnecting means of all of the concentrators during the recordation of the time information.

References Cited

UNITED STATES PATENTS

| | | | |
|---|---|---|---|
| 3,029,414 | 4/1962 | Schrimpf | 340—172.5 |
| 3,200,380 | 8/1965 | Mac Donald et al. | 340—172.5 |
| 3,283,306 | 11/1966 | Patrusky | 340—172.5 |
| 3,286,240 | 11/1966 | Thompson et al. | 340—172.5 |
| 3,299,210 | 1/1967 | Bandy | 340—172.5 X |
| 3,302,182 | 1/1967 | Lynch et al. | 340—172.5 |
| 3,323,110 | 5/1967 | Oliari et al. | 340—172.5 |

PAUL J. HENON, *Primary Examiner.*